(12) United States Patent
Takeda et al.

(10) Patent No.: US 8,740,199 B2
(45) Date of Patent: Jun. 3, 2014

(54) SPRING ASSEMBLY AND MANUFACTURING METHOD THEREFOR

(75) Inventors: Kensuke Takeda, Kanagawa (JP); Yasutaka Uematsu, Kanagawa (JP); Toshie Fueki, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 158 days.

(21) Appl. No.: 12/801,563

(22) Filed: Jun. 15, 2010

(65) Prior Publication Data

US 2010/0320660 A1 Dec. 23, 2010

(30) Foreign Application Priority Data

Jun. 18, 2009 (JP) .............................. P. 2009-145878
Dec. 4, 2009 (JP) .............................. P. 2009-276074
May 21, 2010 (JP) .............................. P. 2010-117137

(51) Int. Cl.
*F16F 1/06* (2006.01)

(52) U.S. Cl.
USPC .............................. 267/179; 267/287; 29/512

(58) Field of Classification Search
USPC ................. 267/179; 29/505, 512, 428, 896.91
See application file for complete search history.

(56) References Cited

U.S. PATENT DOCUMENTS

| | | | | | |
|---|---|---|---|---|---|
| 1,466,363 | A | * | 8/1923 | Hamilton | 38/63 |
| 3,122,829 | A | * | 3/1964 | Schaad et al. | 29/436 |
| 3,782,708 | A | * | 1/1974 | Dulude et al. | 267/91 |
| 3,861,661 | A | * | 1/1975 | Yazaki | 267/33 |
| 3,921,966 | A | * | 11/1975 | Genbauffe | 267/166 |
| 4,371,154 | A | * | 2/1983 | Winbigler | 267/179 |
| 5,772,191 | A | * | 6/1998 | Nakano et al. | 267/289 |
| 5,911,295 | A | * | 6/1999 | Itonaga et al. | 192/70.28 |
| 6,811,143 | B2 | * | 11/2004 | Creissel et al. | 251/337 |
| 7,127,792 | B2 | * | 10/2006 | Wakamori et al. | 29/509 |
| 7,311,307 | B2 | * | 12/2007 | Dahlheimer | 277/373 |
| 7,357,381 | B2 | | 4/2008 | Wakamori et al. | |
| 7,374,157 | B2 | * | 5/2008 | Wakamori et al. | 267/179 |
| 2005/0017422 | A1 | | 1/2005 | Wakamori et al. | |

FOREIGN PATENT DOCUMENTS

| | | | |
|---|---|---|---|
| CN | 1041431 | A | 4/1990 |
| CN | 2333838 | Y | 8/1999 |
| CN | 201137661 | Y | 10/2008 |
| JP | 56046128 | A * | 4/1981 ................... 267/179 |

(Continued)

OTHER PUBLICATIONS

Chinese Office Action dated Jun. 25, 2013, with English-language translation.

(Continued)

*Primary Examiner* — Thomas J Williams
*Assistant Examiner* — Mariano Sy
(74) *Attorney, Agent, or Firm* — McGinn IP Law Group, PLLC

(57) ABSTRACT

According to one embodiment, a spring assembly includes: a substrate; a coil spring having an end turn portion fixed to the substrate; an inner wall provided at an inner peripheral side of the coil spring; and an outer wall provided at an outer peripheral side of the coil spring, wherein one of the inner wall and the outer wall forms a spring fixing wall configured to prevent the end turn portion of the coil spring from coming off in an axial direction of the coil spring, and wherein the other of the inner wall and the outer wall forms a support wall configured to prevent the end turn portion of the coil spring from moving in a radial direction of the coil spring.

13 Claims, 13 Drawing Sheets

(56) References Cited

FOREIGN PATENT DOCUMENTS

| | | |
|---|---|---|
| JP | 61-112139 | 7/1986 |
| JP | 09-303423 A | 11/1997 |
| JP | 2005-24003 A | 1/2005 |

OTHER PUBLICATIONS

Japanese Notification of Reasons for Refusal, dated Sep. 11, 2013, with English-language translation.

\* cited by examiner

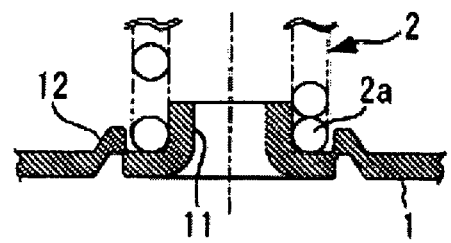
*Fig. 3A*
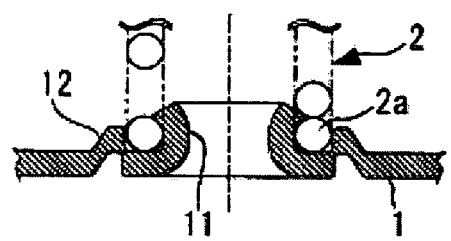
*Fig. 3B*
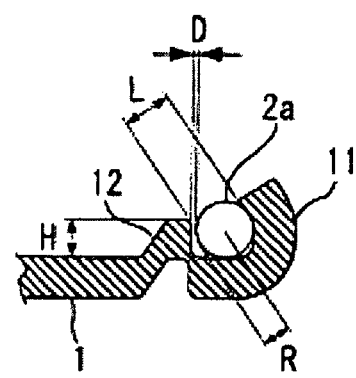 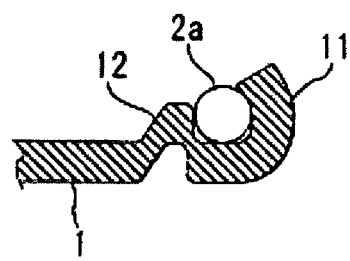
*Fig. 3C*  *Fig. 3D*

SPRING ASSEMBLY AND MANUFACTURING METHOD THEREFOR

CROSS-REFERENCE TO RELATED APPLICATION(S)

This application claims priorities from Japanese Patent Application No. 2009-145878 filed on Jun. 18, 2009, Japanese Patent Application No. 2009-276074 filed on Dec. 4, 2009, and Japanese Patent Application No. 2010-117137 filed on May 21, 2010, the entire contents of which are incorporated herein by reference.

BACKGROUND

1. Field of the Invention

An aspect of the present invention relates to a spring assembly to be used as, for example, a return spring for a multi-plate clutch piston in a clutch mechanism of an automatic transmission of an automobile.

2. Description of the Related Art

JP-2005-024003-A discloses a spring assembly including two annular plates and plural coil springs interposed between the two annular plates. In the spring assembly, an end turn portion (end portion) of the coil spring is inserted into a cylindrical projecting portion extending from each annular plate, and then a distal opening edge of the cylindrical projecting portion is flared to stake (fix) the end turn portion of the coil spring to the cylindrical projecting portion of the annular plate.

In the spring assembly, when a large axial tensile force acts on the coil spring, the end turn portion of the coil spring may be expanded to climb over the distal opening edge of the cylindrical projecting portion, and the coil spring may come off the annular plate.

In a spring assembly disclosed in JP-UM-S61-112139-A, a coil spring has an end turn portion broadened in a radial direction as compared with a second-stage (or higher-stage) turn. For example, the end turn portion of the coil spring is inserted into a cylindrical boss extended from a substrate, and a stepped cover is attached onto the substrate, thereby sandwiching the end turn portion of the coil spring broadened in the radial direction by the stepped cover and the substrate in an axial direction.

In the spring assembly of JP-UM-S61-112139-A, the end turn portion of the coil spring may not come off the substrate. However, since the end turn portion of the coil spring is broadened in the radial direction and the stepped cover is provided in addition to the substrate and coil spring, the manufacturing process is cumbersome and complicated.

SUMMARY

One of objects of the present invention is to provide a spring assembly to be easily processed and manufactured while securely fixing a coil spring to a substrate.

According to a first aspect of the present invention, there is provided a spring assembly including: a substrate; a coil spring having an end turn portion fixed to the substrate; an inner wall provided at an inner peripheral side of the coil spring; and an outer wall provided at an outer peripheral side of the coil spring, wherein one of the inner wall and the outer wall forms a spring fixing wall configured to prevent the end turn portion of the coil spring from coming off in an axial direction of the coil spring, and wherein the other of the inner wall and the outer wall forms a support wall configured to prevent the end turn portion of the coil spring from moving in a radial direction of the coil spring.

According to a second aspect of the present invention, there may be provided the spring assembly, wherein the inner wall extends from the substrate along the inner peripheral side of the coil spring, and wherein the outer wall extends from the substrate along the outer peripheral side of the coil spring.

According to a third aspect of the present invention, there may be provided the spring assembly, wherein the inner wall or the outer wall forming the support wall is formed by half blanking to the substrate.

According to a fourth aspect of the present invention, there may be provided the spring assembly, wherein the inner wall or the outer wall forming the support wall is formed by cutting and bending up the substrate.

According to a fifth aspect of the present invention, there may be provided the spring assembly, wherein the inner wall or the outer wall forming the spring fixing wall is formed as a cylindrical wall extending from the substrate, wherein a distal opening edge of the cylindrical wall is broadened or narrowed in diameter to stake the end turn portion of the coil spring to the cylindrical wall of the substrate, wherein an extension amount of the spring fixing wall from the substrate is set larger than a radius of a wire rod forming the coil spring, wherein an interval between a distal end of the spring fixing wall and a distal end of the support wall after being staked is smaller than a diameter of the wire rod, and wherein a gap is formed between the outer wall or inner wall forming the support wall and the end turn portion of the coil spring.

According to a sixth aspect of the present invention, there may be provided the spring assembly, wherein the inner wall or the outer wall forming the spring fixing wall is formed as a cylindrical wall extending from the substrate, wherein a distal opening edge of the cylindrical wall is broadened or narrowed in diameter to stake the end turn portion of the coil spring to the cylindrical wall of the substrate, and wherein the outer wall or inner wall forming the support wall is in contact with the end turn portion of the coil spring.

According to a seventh aspect of the present invention, there may be provided a method for manufacturing the spring assembly, the method including: coaxially arranging the end turn portion of the coil spring to the cylindrical wall of the substrate; and broadening or narrowing the distal opening edge of the cylindrical wall in diameter to form the cylindrical wall into the spring fixing wall while bringing the end turn portion of the coil spring into contact with the outer wall or inner wall forming the support wall.

According to an eighth aspect of the present invention, there may be provided the spring assembly, wherein the coil spring is provided as an inner coil spring, wherein an outer coil spring is arranged outside the inner coil spring, and wherein an end turn portion of the outer coil spring is narrowed in diameter to form the support wall.

According to a ninth aspect of the present invention, there may be provided the spring assembly, wherein the end turn portion of the inner coil spring is also narrowed in diameter so that an inner diameter of the end turn portion of the outer coil spring is smaller than an outer diameter of a second-stage turn of the inner coil spring.

According to a tenth aspect of the present invention, there may be provided the spring assembly, wherein a convex portion protruding from the substrate is formed at the outer peripheral side of the end turn portion of the outer coil spring.

According to an eleventh aspect of the present invention, there may be provided the spring assembly, wherein the coil spring is provided as an outer coil spring, wherein an inner coil spring is arranged inside the outer coil spring, and wherein an end turn portion of the inner coil spring is broadened in diameter to form the support wall.

According to a twelfth aspect of the present invention, there may be provided the spring assembly, wherein the end turn portion of the outer coil spring is also broadened in diameter so that an outer diameter of the end turn portion of the inner coil spring is larger than an inner diameter of a second-stage turn of the outer coil spring.

According to the first aspect of the present invention, the end turn portion of the coil spring is prevented from coming off in the axial direction and from moving in the radial direction by simply providing the inner wall and the outer wall, thereby securely fixing the coil spring to the substrate.

According to the second aspect of the present invention, the inner wall and the outer wall extended from the substrate prevent the end turn portion of the coil spring from coming off in the axial direction and from moving in the radial direction, without special processing for the coil spring or additional components, thereby simplifying the processing and the manufacturing.

According to the third aspect of the present invention, since the inner wall or the outer wall forming the support wall formed by half blanking functions also as a reinforce rib for the substrate, the strength of, the substrate is improved.

According to the fourth aspect of the present invention, in a case where the spring assembly is used as a return spring for a multi-plate clutch piston in a clutch mechanism of an automatic transmission of an automobile, when a lubricating oil is supplied to the part where the coil spring is disposed, since a cutout hole opened in the substrate functions as an oil-drain hole, the fluidity of the lubricating oil is improved. Moreover, depending on the use, the cutout hole may function as a water-drain hole.

According to the fifth aspect of the present invention, since a gap is formed between the outer wall or inner wall forming the support wall and the end turn portion of the coil spring after staking, the support wall may not interfere with a second-stage turn of the coil spring, and the characteristics of the coil spring may not fluctuate due to the existence of the support wall. Moreover, even when the gap is formed, since the interval between the distal end of the support wall and the distal end of the spring fixing wall after staking is smaller than the diameter of the wire rod forming the coil spring, the coil spring is reliably prevented from coming off the spring fixing wall.

According to the sixth aspect of the present invention, since the outer wall or inner wall forming the support wall contacts the end turn portion of the coil spring, the end turn portion of the coil spring is securely supported without rattling.

According to the seventh aspect of the present invention, the support wall prevents the radial movement of the end turn portion of the coil spring during the staking operation, so that the staking operation is uniformly performed and the rigidity is improved.

According to the eighth aspect of the present invention, in the configuration where an outer coil spring is arranged outside an inner coil spring, a fixing wall preventing the inner coil spring from axially coming off or a support wall preventing the inner coil spring from radially moving can be formed by only narrowing the end turn portion of the outer coil spring in diameter.

According to the ninth aspect of the present invention, the outer coil spring is prevented from axially coming off by the second-stage turn of the inner coil spring.

According to the tenth aspect of the present invention, the convex portion protruding from the substrate prevents the radial movement of the outer coil spring, thereby enhancing the structural rigidity thereof, and preventing buckle of the outer coil spring.

According to the eleventh aspect of the present invention, in the configuration where an inner coil spring is arranged inside an outer coil spring, a fixing wall preventing the outer coil spring from axially coming off or a support wall preventing the outer coil spring from radially moving can be formed by only broadening the end turn portion of the inner coil spring in diameter.

According to the twelfth aspect of the present invention, the inner coil spring is prevented from axially coming off by the second-stage turn of the outer coil spring.

According to the present invention, the end turn portion of a coil spring is prevented from coming off in the axial direction and from moving in the radial direction by simply providing an inner wall and an outer wall, thereby securely fixing the coil spring to the substrate with the simple processing and the manufacturing.

DRAWINGS

FIGS. 3A to 3D illustrate a fixing (staking) configuration of a coil spring and a substrate in a spring assembly according to a first embodiment.

FIG. 11A illustrates a state where a free end shown in. FIG. 9B is brought into contact with the counterpart member, and 11B illustrates a state where a free end shown in FIG. 10B is brought into contact with the counter part member.

FIGS. 12A to 12E illustrate other fixing configurations of a coil spring and a substrate.

DETAILED DESCRIPTION

Hereinafter, spring assemblies according to embodiments will be described with reference to the drawings. In the embodiments, the spring assembly is exemplified as a return spring for a multi-plate clutch piston in a clutch mechanism of an automatic transmission of an automobile. However, the spring assemblies according to the embodiments are not limited thereto and may be applied to the other purpose.

Figure 1:
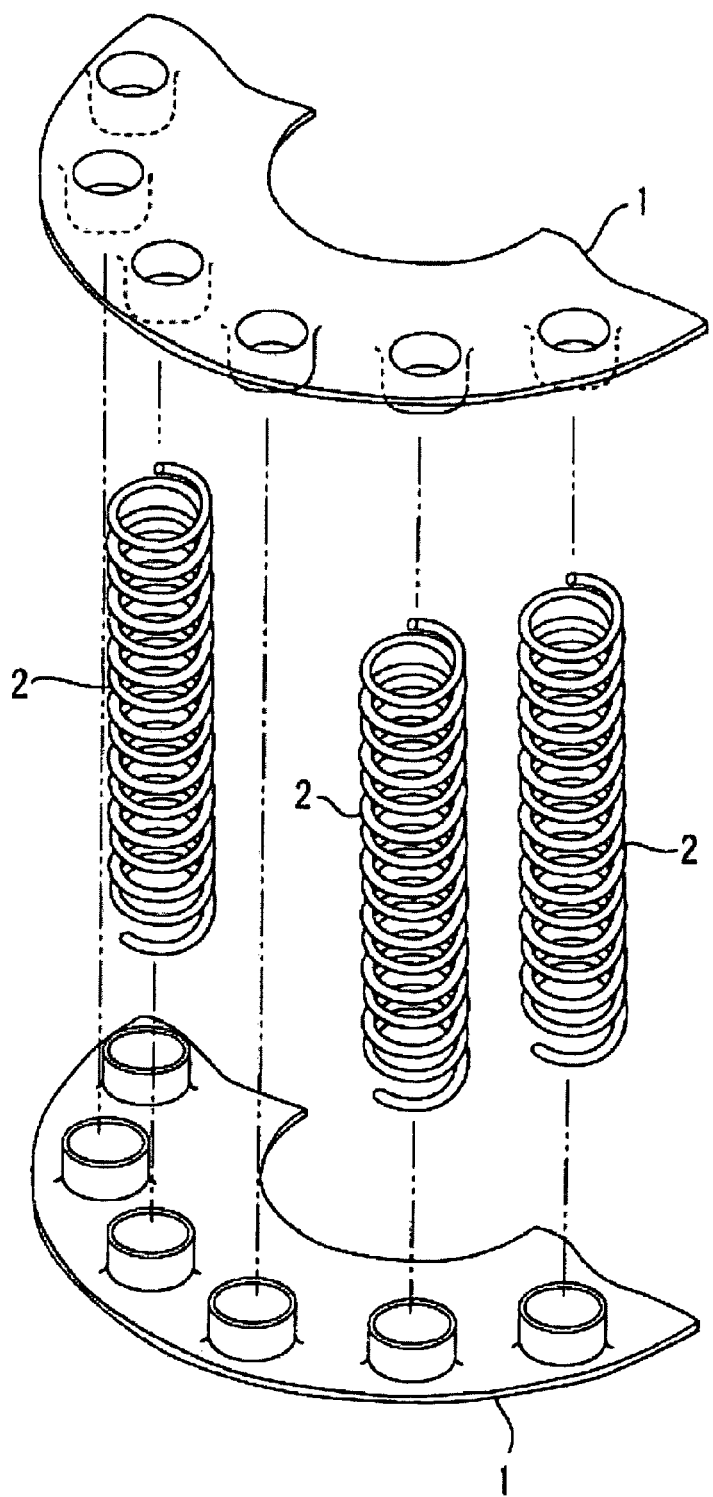
FIG. 1 is an exploded perspective view of a spring assembly according to an embodiment, when the spring assembly is used as a return spring for a multi-plate clutch piston in a clutch mechanism of an automatic transmission of an automobile.

FIG. 1 is an exploded perspective view of a spring assembly according to an embodiment, when the spring assembly is used as a return spring for a multi-plate clutch piston in a clutch mechanism of an automatic transmission of an automobile.

For example, the spring assembly includes a pair of annular-shaped substrates 1 and plural coil springs 2. Each coil spring 2 has end turn portions 2a at both ends thereof, and the end turn portions 2a are fixed to each substrate 1 with given intervals. In the embodiment, the end turn portion 2a of the coil spring 2 is fixed (staked) to the substrate 1 so as to create a friction fit therebetween. The substrate 1 may be formed by connecting plural segmented substrate pieces into an annular shape.

Figure 2A:
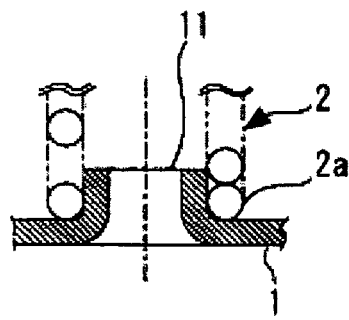
FIGS. 2A to 2C illustrate a fixing (staking) configuration of a coil spring and a substrate in a spring assembly according to a comparison example.
Figure 2B:
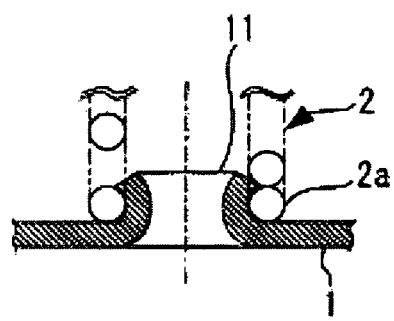
Figure 2C:
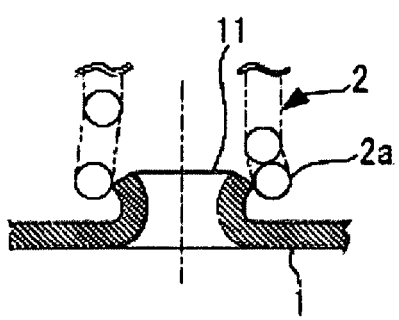

FIGS. 2A to 2C illustrate a fixing (staking) configuration of a coil spring and a substrate in a spring assembly according to a comparison example.

For example, a cylindrical wall 11 is formed to extend from the substrate 1, and the end turn portion 2a of the coil spring 2 is fitted with this cylindrical wall 11 (FIG. 2A), and a distal opening edge of the cylindrical wall 11 is flared (broadened in diameter), thereby fixing (staking) the end turn portion 2a (FIG. 2B).

When an axial tensile force acts on the coil spring 2 thus fixed (staked) to the substrate 1, as shown FIG. 2C, the end turn portion 2a may be expanded in the radial direction to climb over the distal opening edge of the cylindrical wall 11 and may come off in the axial direction.

[First Embodiment]

FIGS. 3A to 3D illustrate a fixing (staking) configuration of a coil spring and a substrate in a spring assembly according to a first embodiment.

The spring assembly has the following configuration to prevent the end turn portion 2a from coming off.

That is, an inner wall 11 and an outer wall 12 are formed on the substrate 1. The inner wall 11 is extended to be along with an inner peripheral side of the coil spring 2, and the outer wall 12 is extended to be along with an outer peripheral side of the coil spring 2. The inner wall 11 functions as a spring fixing wall 11 that prevents the end turn portion 2a of the coil spring 2 from coming off in the axial direction, and the outer wall 12 functions as a support wall 12 that prevents the end turn portion 2a of the coil spring 2 from moving in the radial direction.

A cylindrical wall 11 (to be processed into the spring fixing wall 11 through staking) is extended almost perpendicularly from the substrate 1. This spring fixing wall 11 is formed by, for example, burring. Moreover, the support wall 12 is formed by half blanking to the substrate 1. When the support wall 12 is formed by half blanking, no cutout hole is formed in the substrate 1, thereby maintaining rigidity of the substrate 1. Further, when the support wall 12 is formed by half blanking, the support wall 12 functions also as a reinforce rib for the substrate 1, thereby improving rigidity of the substrate 1.

The coil spring 2 is fixed to the substrate 1 by the following procedure. That is, the end turn portion 2a of the coil spring 2 is fitted with the cylindrical wall 11 (FIG. 3A). At this time, the support wall 12 is positioned at the outer peripheral side of the end turn portion 2a. In this condition, a distal opening edge of the cylindrical wall 11 is flared so that the end turn portion 2a of the coil spring 2 is fixed (staked) to the substrate 1 (FIG. 3B). At this time, the end turn portion 2a of the coil spring 2 and the support wall 12 may be separated with a gap D (FIG. 3C), or may be brought into contact with each other (FIG. 3D).

As shown in FIG. 3C, when the gap D is formed between the end turn portion 2a of the coil spring 2 and the support wall 12, the support wall 12 may not interfere with a second-stage turn of the coil spring 2, and the characteristics of the coil spring 2 may not fluctuate due to the existence of the support wall 12. The extension amount H of the support wall 12 from the substrate 1 may be set larger than a radius R of a wire rod forming the coil spring 2 (H>R), and the interval L between the distal end of the spring fixing wall 11 and the distal end of the support wall 12 after being fixed (staked) may be set smaller than a diameter 2R of the wire rod (L<2R). By such a configuration, even when the gap D is formed, the coil spring 2 is reliably prevented from coming off the spring fixing wall 11.

When the end turn portion 2a of the coil spring 2 and the support wall 12 are brought into contact with each other as shown in FIG. 3D, a gap may be formed between the end turn portion 2a and the support wall 12 before starting the staking operation, and the end turn portion 2a of the coil spring 2 may be radially expanded to contact the support wall 12 as a result of the staking operation. In this way, the support wall 12 prevents the radial movement of the end turn portion 2a of the coil spring 2 during the staking operation, so that the staking operation is uniformly performed and the rigidity is improved. Since the support wall 12 contacts the end turn portion 2a of the coil spring 2, the end turn portion 2a is securely supported without rattling.

Figure 4A:
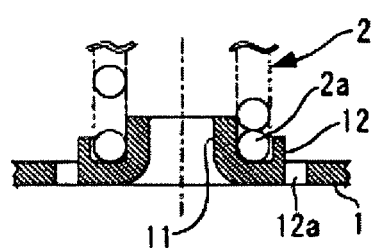
FIGS. 4A and 4B illustrate another fixing (staking) configuration in the spring assembly according to the first embodiment.
Figure 4B:
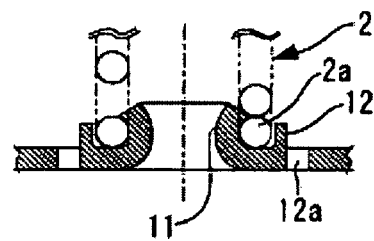

The support wall 12 may be formed by cutting and bending up the substrate 1 as shown in FIGS. 4A and 4B. In a case where the substrate 1 is cut and bent up to form the support wall 12, a cutout hole 12a is opened in the substrate 1. This cutout hole 12a can be used as an oil-drain or water-drain hole. For example, in a case where the spring assembly is used as a return spring for a multi-plate clutch piston in a clutch mechanism of an automatic transmission of an automobile, when a lubricating oil is supplied to the part where the coil spring 2 is disposed, the lubricating oil can be discharged through the cutout hole 12a, thereby improving fluidity of the lubricating oil.

FIG. 4A shows a state before flaring the distal opening edge of the cylindrical wall 11, and FIG. 4B shows a state after flaring the distal opening edge to fix (stake) the end turn portion 2a of the coil spring 2.

The present invention is not limited to the above embodiment, and for example, the outer wall and inner wall formed on the substrate may be interchanged so that the outer wall functions as a spring fixing wall and the inner wall functions as a support wall.

[Second Embodiment]

Next, a second embodiment will be described.

In a spring assembly according to the present embodiment, plural coil springs are coaxially arranged to increase the spring force against the substrate.

Figure 5A:
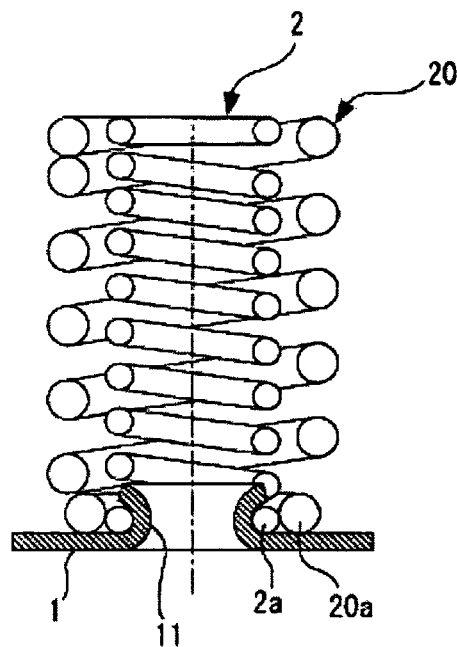
FIGS. 5A to 5D illustrate a spring assembly according to a second embodiment, FIG. 5A and FIG. 5C illustrating respective examples, FIG. 5B showing a part of FIG. 5A, FIG. 5D showing a part of FIG. 5C.
Figure 5B:
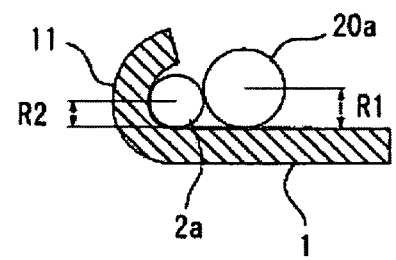
Figure 5C:
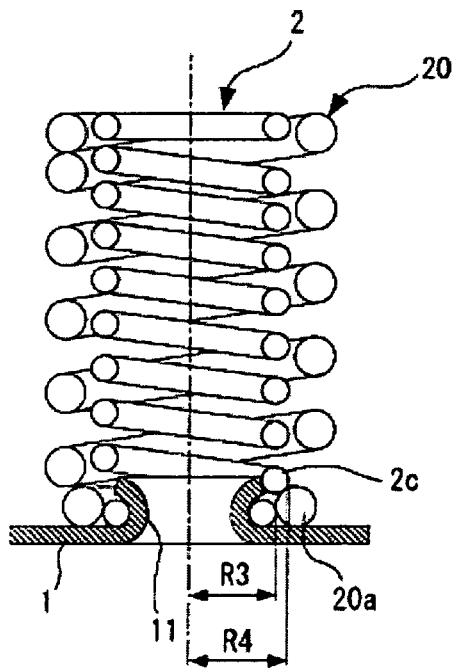
Figure 5D:
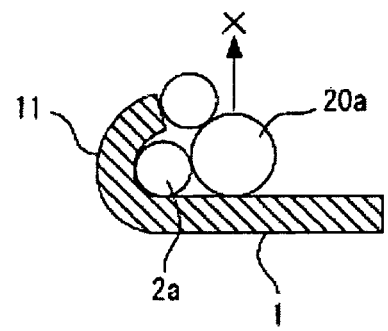

FIGS. 5A to 5D illustrate a spring assembly according to the second embodiment, FIG. 5A and FIG. 5C illustrating respective examples, FIG. 5B showing a part of FIG. 5A, FIG. 5D showing a part of FIG. 5C.

As shown in FIG. 5A, an inner coil spring 2 and an outer coil spring 20 are coaxially arranged on the substrate 1. The outer coil spring 20 arranged outside the inner coil spring 2 has an end turn portion 20a narrowed in diameter, and the end turn portion 20a functions as a support wall for the inner coil spring 2. That is, by narrowing the end turn portion 20a of the outer coil spring 20 in diameter, the end turn portion 20a closely approach or contact the end turn portion 2a of the inner coil spring 2 from outside. Thus, the end turn portion 2a of the inner coil spring 2 is prevented from moving in the radial direction by the end turn portion 20a of the outer coil spring 20.

In addition, as in the first embodiment, a spring fixing wall 11 is formed to extend from the substrate 1 at the inner peripheral side of the inner coil spring 2.

As shown in FIG. 5B, a radius R1 of a wire rod forming the outer coil spring 20 may be set larger than a radius R2 of a wire rod forming the inner coil spring 2 (R1>R2). In this case, when being attempted to come off, the end turn portion 2a of the inner coil spring 2 contacts the end turn portion 20a of the outer coil spring 20 and is prevented from coming off in the axial direction. That is, the outer coil spring 20 functions as the spring fixing wall. When the outer coil spring 20 functions as the spring fixing wall preventing the inner coil spring 2 from coming off, the cylindrical wall 11 of the substrate 1 is not necessary to function as the spring fixing wall and only necessary to function as the support wall preventing the inner coil spring 2 from moving in the radial direction. Therefore, it is not necessary to fix the inner coil spring 2 to the cylindrical wall 11 of the substrate 1 by staking.

As shown in FIG. 5C, the end turn portion 2a of the inner coil spring 2 may be narrowed in diameter, and the end turn portion 20a of the outer coil spring 20 may be also narrowed in diameter to closely approach or contact the end turn portion 2a from outside. And, an inner diameter 2R3 of the end turn portion 20a of the outer coil spring 20 may be set smaller than an outer diameter 2R4 of a second-stage turn 2c of the inner coil spring 2 (R3<R4). As a result, the outer coil spring 20 is prevented from coming off in the axial direction by the second-stage turn 2c of the inner coil spring 2 (see FIG. 5D).

In the spring assembly as shown in FIG. 1 where the substrates 1 are arranged at both ends of the coil spring 2, the outer coil spring 20 as shown in FIG. 5A may not come off in the axial direction. However, in the spring assembly where the substrate 1 is attached only to one end of the inner coil spring 2 and the other end thereof is opened, when the outer coil spring 20 is simply arranged outside the inner coil spring 2, the outer coil spring 20 may easily come off. It is therefore necessary to provide some measure to prevent the outer coil spring 20 from coming off in the axial direction at the time of factory shipment or the like.

By configuring as shown in FIG. 5C, the outer coil spring 20 is prevented from coming off in the axial direction, without providing a separate component for coming off prevention.

Figure 6:
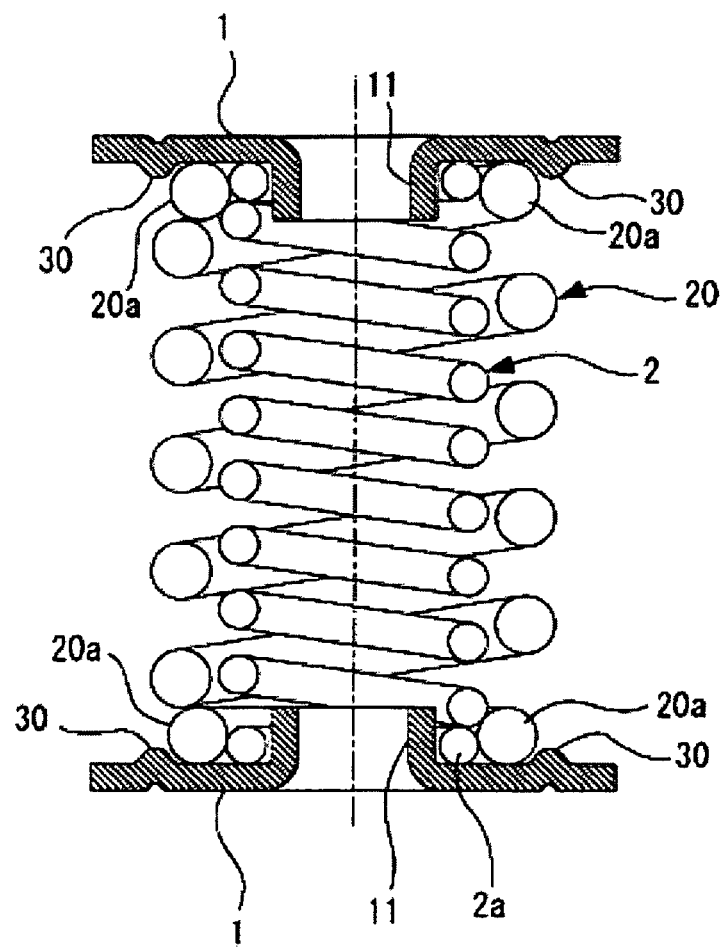
FIG. 6 illustrates the spring assembly according to a modification of the second embodiment.

In a spring assembly as shown in FIG. 6, a convex portion 30 is formed to protrude from the substrate 1 at the outer peripheral side of the end turn portion 20a of the outer coil spring 20. The convex portion 30 has an effect of enhancing rigidity of the outer coil spring 20. That is, when an external force acts on the substrate 1 in a horizontal direction (a direction perpendicular to the axis direction), the outer coil spring 20 may be deformed while slipping on the surface of the substrate 1. At this time, if the convex portion 30 is formed at the outer peripheral side of the end turn portion 20a of the outer coil spring 20, the end turn portion 20a is prevented from slipping by the convex portion 30, thereby preventing deformation. As a result, a resistance force against the external force is enhanced, and buckle of the outer coil spring 20 is prevented.

In an example shown in FIG. 6, the convex portion 30 is formed by the extrusion molding. However, shape (a position, a height and the like) and forming method are not limited thereto. For example, the convex portion 30 is formed by half blanking to the substrate 1, cutting and bending up the substrate 1, or attaching a separate component.

Figure 7:
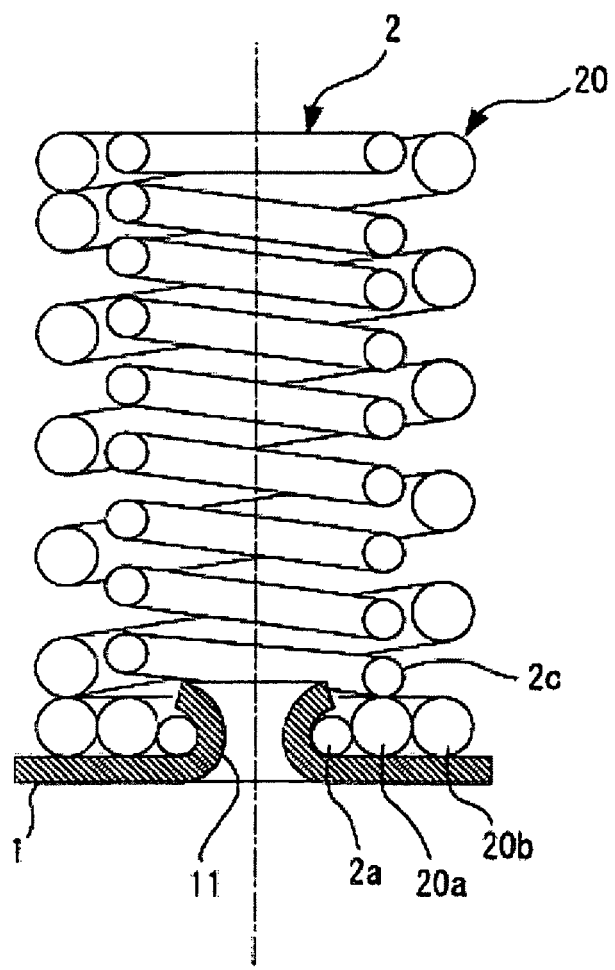
FIG. 7 illustrates a spring assembly according to another modification of the second embodiment.

In a spring assembly as shown in FIG. 7, the outer coil spring 20 has a double-turned structure of an end turn portion 20a and an end turn portion 20b. The end turn portions 20a and 20b of the outer coil spring 20 are narrowed in diameter to closely approach or contact the end turn portion 2a of the inner coil spring 2 from outside, thereby functioning as a support wall for the inner coil spring 2. By arranging the end turn portion 20b of the outer coil spring 20 outside, the end turn portion 2a of the inner coil spring 2 is strongly held by the end turn portions 20a and 20b, and the radial movement of the end turn portion 2a is prevented. When a radius R1 of a wire rod forming the outer coil spring 20 is larger than a radius R2 of a wire rod forming the inner coil spring 2 (R1>R2) as shown in FIG. 5A, the end turn portion 20b of the outer coil spring 20 prevents the inner coil spring 2 from coming off in the axial direction, thereby functioning as the spring fixing wall.

In this case, since the cylindrical wall 11 at the inner peripheral side of the inner spring coil 2 is not necessary to function as the spring fixing wall and only necessary to function as the support wall to prevent the radial movement of the inner coil spring 2, it is not necessary to fix the inner coil spring 2 to the cylindrical wall 11 of the substrate 1 by staking.

[Third Embodiment]

Next, a third embodiment will be described.

In a spring assembly according to the present embodiment, plural coil springs are coaxially arranged to increase the spring force against the substrate, as the second embodiment.

Figure 8A:
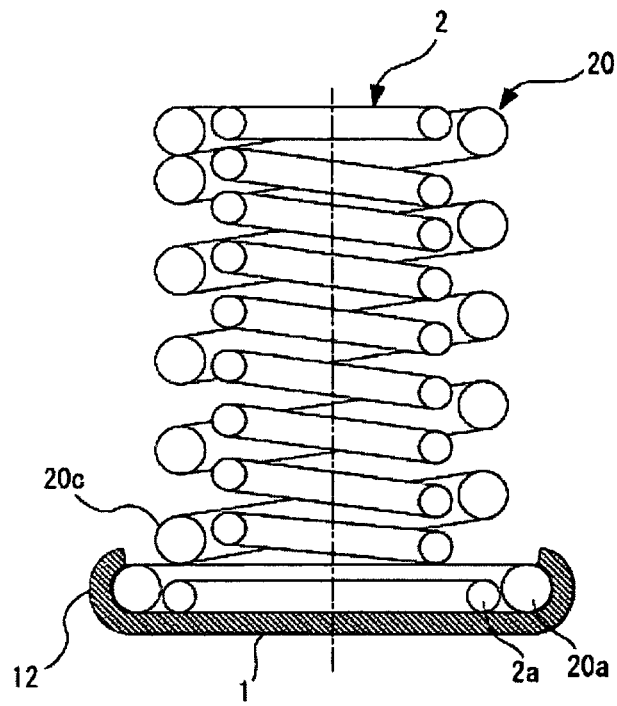
FIG. 8A illustrates a spring assembly according to a third embodiment.
Figure 8B:
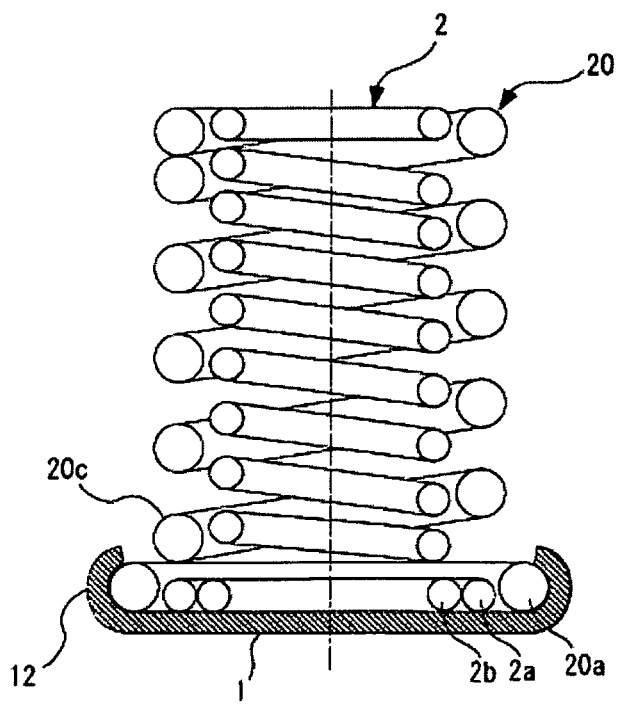
FIG. 8B illustrates a spring assembly according to a modification of the third embodiment.

FIGS. 8A and 8B respectively illustrate configurations of the spring assembly according to the third embodiment.

As shown in FIG. 8A, an inner coil spring 2 and an outer coil spring 20 are coaxially arranged on the substrate 1. The inner coil spring 2 arranged at the inner peripheral side of the outer coil spring 20 has an end turn portion 2a broadened in diameter, and the end turn portion 2a functions as a support wall for the outer coil spring 20. That is, by broadening the end turn portion 2a of the inner coil spring 2 in diameter, the end turn portion 2a closely approach or contact the end turn portion 20a of the outer coil spring 20 from inside. Thus, the end turn portion 20a of the outer coil spring 20 is prevented from moving in the radial direction by the end turn portion 2a of the inner coil spring 2.

In addition, in the present embodiment, an outer-side wall 12 of the substrate 1 is formed to fix the end turn portion 20a of the outer coil spring 20 from outside and functions as the spring fixing wall preventing the outer coil sprint 20 from coming off in the axial direction.

In the figures, a radius of a wire rod forming the outer coil spring 20 is larger than a radius of a wire rod forming the inner coil spring 2. However, the radius of the wire rod forming the inner coil spring 2 may be set larger than the radius of the wire rod forming the outer coil spring 20. In this case, when being attempted to come off, the end turn portion 20a of the outer coil spring 20 contacts the end turn portion 2a of the inner coil spring 2 and is prevented from coming off in the axial direction. That is, the inner coil spring 2 functions as the spring fixing wall. When the inner coil spring 2 functions as the spring fixing wall preventing the outer coil spring 20 from coming off, the outer-side wall 12 of the substrate 1 is not necessary to function as the spring fixing wall and only necessary to function as the support wall preventing the outer coil spring 20 from moving in the radial direction. Therefore, it is not necessary to fix the outer coil spring 20 to the outer-side wall 1 of the substrate 1 by staking.

As shown in FIG. 8A, the end turn portion 2*a* of the inner coil spring 2 may be broadened in diameter so that an outer diameter of end turn portion 2*a* is larger than an inner diameter of a second-stage turn 20*c* of the outer coil spring 20. In this case, the inner coil spring 2 is prevented from coming off in the axial direction by the second-stage turn 20*c* of the outer coil spring 20.

In the spring assembly where the substrate 1 is attached only to one end of the outer coil spring 20 and the other end thereof is opened, when the inner coil spring 2 is simply arranged inside the outer coil spring 20, the inner coil spring 2 may easily come off. It is therefore necessary to provide some measure to prevent the inner coil spring 2 from coming off in the axial direction at the time of factory shipment or the like.

By configuring as above, the inner coil spring 2 is prevented from coming off in the axial direction, without providing a separate component for coming off prevention.

In a spring assembly as shown in FIG. 8B, the inner coil spring 2 has a double-turned structure of an end turn portion 2*a* and an end turn portion 2*b*. The end turn portions 2*a* and 2*b* of the inner coil spring 2 are broadened in diameter to closely approach or contact the end turn portion 20*a* of the outer coil spring 20 from inside, thereby functioning as a support wall for the outer coil spring 20. By arranging the end turn portion 2*b* of the inner coil spring 2 outside, the end turn portion 20*a* of the outer coil spring 20 is strongly held by the end turn portions 2*a* and 2*b*, and the radial movement of the end turn portion 20*a* is prevented.

[Other Configuration Examples]

The present invention is not limited to the above embodiments, and can be variously modified or applied without departing from the technical scope of the present invention.

For example, based on the configuration of the second embodiment shown in FIGS. 5A to 5D and FIG. 6, two or more outer coil springs may be coaxially arranged outside the inner coil spring 2. In this case, while the end turn portion 2*a* of the coil spring 2 is narrowed in diameter, by also narrowing the end turn portions of the outer coil springs in diameter, respectively, so as to interfere with second-stage turns of the coil springs located inside, all outer coil springs are respectively prevented from coming off in the axial direction.

A spring assembly in which plural coil springs are coaxially arranged to increase the spring force against the substrate may include a fixed coil spring (fixed/staked to the substrate) and a non-fixed coil spring (not fixed/staked to the substrate). When the substrate is attached only to one ends of the coil springs and the other ends thereof are opened, in order to prevent the non-fixed coil spring from coming off in the axial direction, the fixed coil spring and the non-fixed coil spring may be configured to interfere with each other by broadening or narrowing a distal end (a free end not fixed to the substrate) of the fixed coil spring in diameter and by narrowing or broadening a proximal end of the non-fixed coil spring in diameter.

Figure 9A:
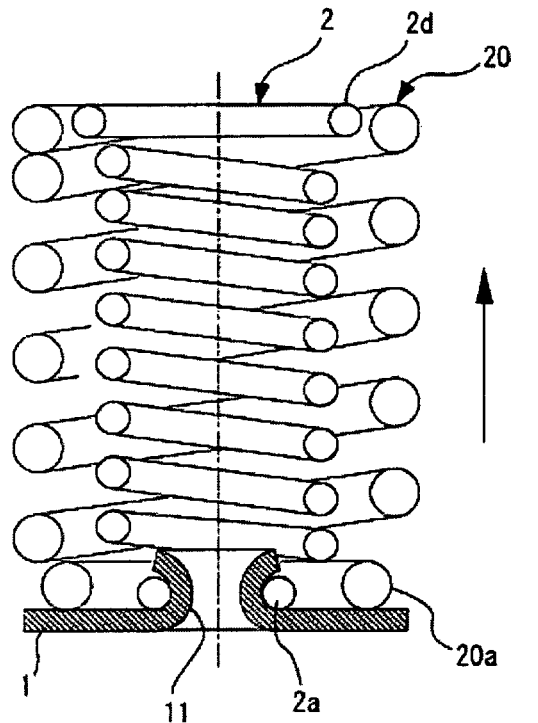
FIGS. 9A and 9B illustrate example configurations for preventing the non-fixed coil spring from coming off in the axial direction.

In a spring assembly as shown in FIG. 9A where only one end of the inner coil spring 2 is fixed to the substrate 1 and the other end thereof is opened, if the outer coil spring 20 is simply arranged outside the inner coil spring 2, the outer coil spring 20 may easily come off. It is therefore necessary to provide some measure to prevent the outer coil spring 20 from coming off in the axial direction at the time of factory shipment or the like.

By broadening the end turn portion 20*a* of the outer coil spring 20 in diameter while narrowing the free end 2*d* of the inner coil spring 2 in diameter, when the outer coil spring 20 attempts to come off in the axial direction as indicated by an arrow in the figure, the end turn portion 20*a* of the outer coil spring 20 interfere with the free end 2*d* of the inner coil spring 2. According to the above configuration, the outer coil spring 20 is prevented from coming off in the axial direction, without providing a separate component for coming off prevention.

Figure 9B:
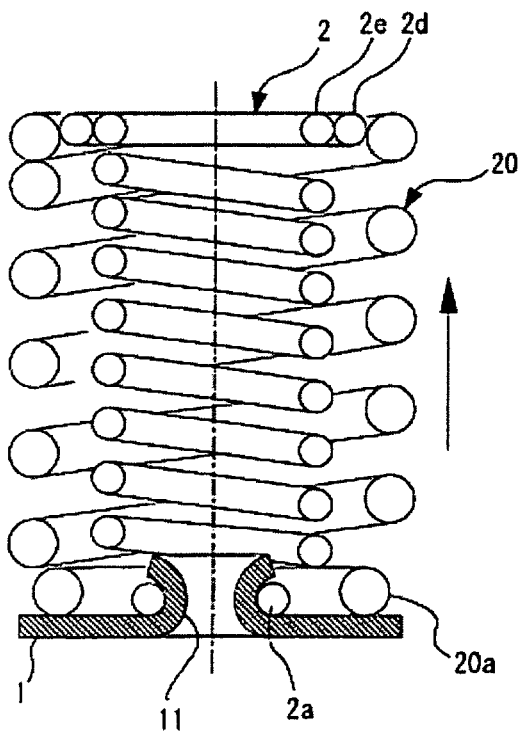

In a spring assembly as shown in FIG. 9B, the inner coil spring 2 has a double-turned free end of an end turn portion 2*d* and an end turn portion 2*e* configured to closely approach or contact a free end 20*d* of the outer coil spring 20, thereby preventing the axial movement of the outer coil spring 20 not fixed to the substrate 1. In this case, an intermediate turn portion of the non-fixed outer coil spring 20 and an intermediate turn portion of the fixed inner coil spring 2 are prevented from interfering or becoming tangled with each other, so that the characteristics of the coil spring may not fluctuate.

Figure 10A:
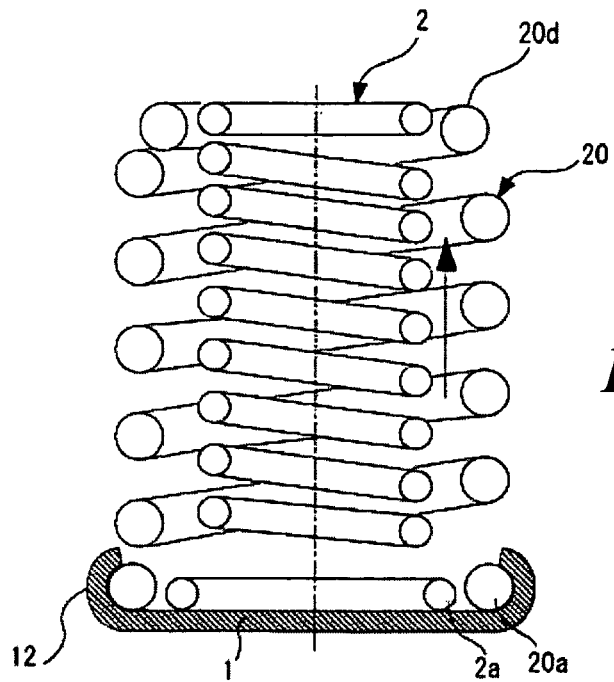
FIGS. 10A and 10B illustrate other example configurations for preventing the non-fixed coil spring from coming off in the axial direction.

In a spring assembly as shown in FIG. 10A where only one end of the outer coil spring 20 is fixed to the substrate 1 and the other end thereof is opened, if the inner coil spring 2 is simply arranged inside the outer coil spring 20, the inner coil spring 2 may easily come off. It is therefore necessary to provide some measure to prevent the outer coil spring 20 from coming off in the axial direction at the time of factory shipment or the like.

By broadening the end turn portion 2*a* of the inner coil spring 2 in diameter while narrowing the free end 20*d* of the outer coil spring 20 in diameter, when the inner coil spring 2 attempts to come off in the axial direction as indicated by an arrow in the figure, the end turn portion 2*a* of the inner coil spring 2 interfere with the free end 20*d* of the outer coil spring 20. According to the above configuration, the inner coil spring 2 is prevented from coming off in the axial direction, without providing a separate component for coming off prevention.

Figure 10B:
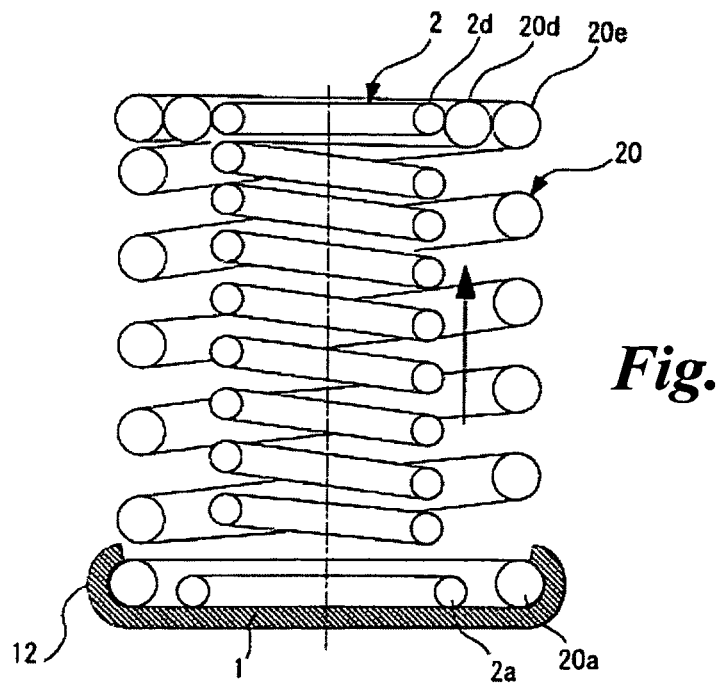

In a spring assembly as shown in FIG. 10B, the outer coil spring 20 has a double-turned free end of an end turn portion 20*d* and an end turn portion 20*e* configured to closely approach or contact a free end 2*d* of the inner coil spring 2, thereby preventing the axial movement of the inner coil spring 2 not fixed to the substrate 1. In this case, an intermediate turn portion of the non-fixed inner coil spring 2 and an intermediate turn portion of the fixed outer coil spring 20 are prevented from interfering or becoming tangled with each other, so that the characteristics of the coil spring may not fluctuate.

Figure 11A:
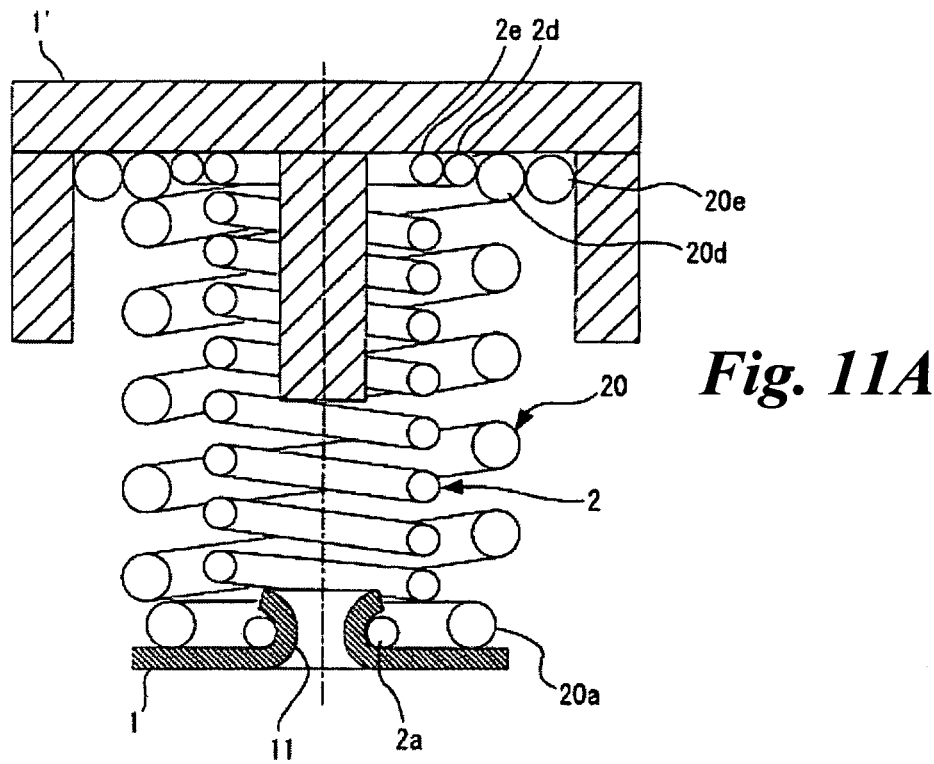
Figure 11B:
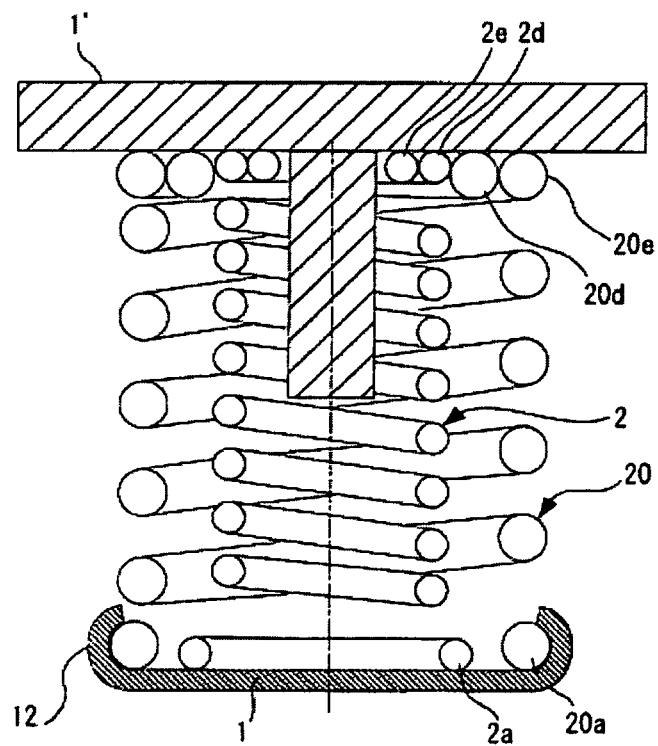

FIG. 11A illustrates a state where a free end shown in FIG. 9B is brought into contact with the counterpart member, and 11B illustrates a state where a free end shown in FIG. 10B is brought into contact with the counter part member. In the configuration shown in FIG. 11A, while the inner coil spring 2 has the double-turned free end (2*d* and 2*e*), the outer coil spring 20 also has a double-turned free end (20*d* and 20*e*). And, in the configuration shown in FIG. 11B, while the outer coil spring 20 has the double-turned free end (20*d* and 20*e*), the inner coil spring 2 also has a double-turned free end (20*d* and 20*e*).

As a result, since the double-turned free end is brought into contact with the counterpart member, a force may be stably applied to the counterpart member.

The following configurations are also effective for securely fixing the end turn portion of the coil spring to the substrate.

Figure 12E:
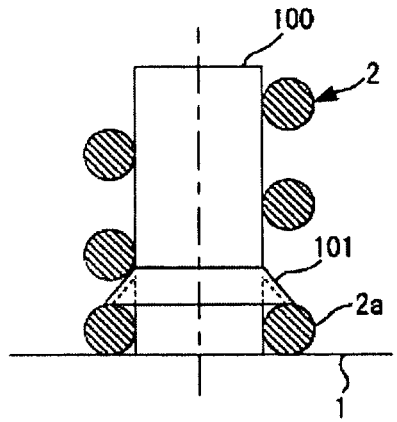
Figure 12E:
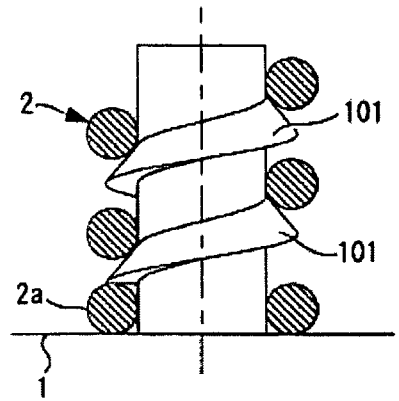
Figure 12E:
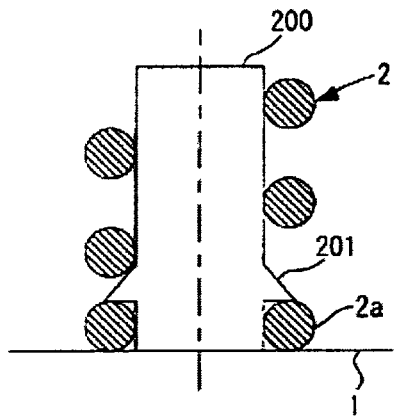
Figure 12E:
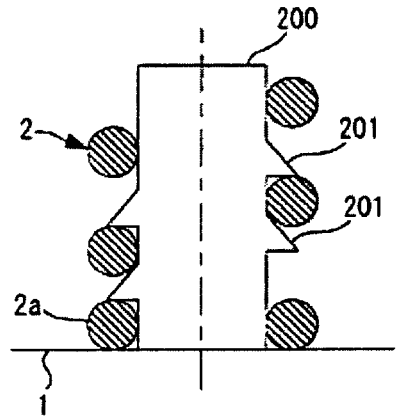
Figure 12E:
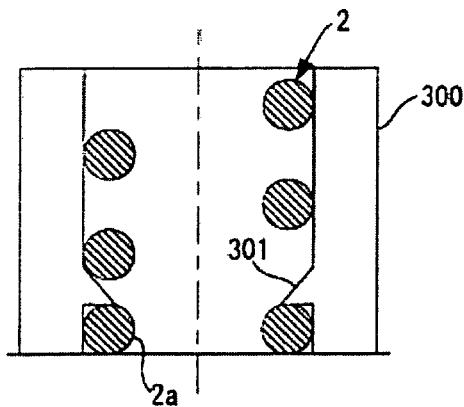

FIGS. 12A to 12E and FIGS. 13A to 13C illustrate various fixing configurations of a coil spring and a substrate. In the configurations shown in FIGS. 12A to 12E, a spring fixing shaft 100 is arranged to protrude from the substrate 1, and a holding projection 101 is provided on the spring fixing shaft 100. The holding projection 101 radially expands toward the substrate 1. The holding projection 101 having an umbrella shape may be simply formed on the peripheral surface of the round rod-like spring fixing shaft 100 as shown in FIG. 12A, so as to catch the end turn portion 2a of the coil spring 2. The holding projection 101 may be spirally formed as shown in FIG. 12B, so as to catch plural turn portions of the coil spring 2. Moreover, as shown in FIG. 12C and FIG. 12D, a holding projection 201 may be formed on a plate-like spring fixing shaft 200.

Further, as shown in FIG. 12E, a cylindrical spring fixing shaft 300 may be provided to surround the coil spring 2, and a holding projection 301 may inwardly protrude from an inner peripheral surface of the spring fixing shaft 300 to catch the coil spring 2.

Figure 13A:
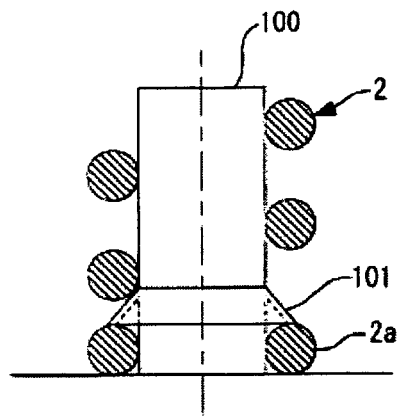
FIGS. 13A to 13C illustrate still other fixing configurations of a coil spring and a substrate.

In the configuration shown in FIG. 13A, the spring fixing shaft 100 frictionally contacts the inner peripheral side of the coil spring 2. If a setting is provided so that the coil spring 2 is radially expanded when the coil spring 2 is screwed toward the proximal end of the spring fixing shaft 100, when the coil spring 2 spirally moves toward the distal end of the spring fixing shaft 100, the coil spring 2 is narrowed in diameter to press-contact the spring fixing shaft 100, and a frictional force (retention force) between the spring fixing shaft 100 and the coil spring 2 increases, so that the coil spring 2 may not come off.

Figure 13B:
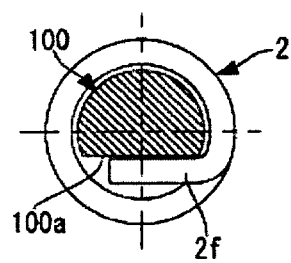
Figure 13C:
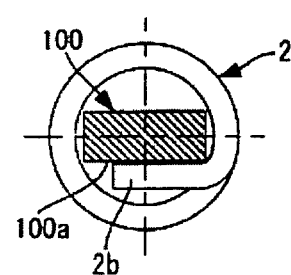

A catching portion may be provided in a proximal end portion of the spring fixing shaft 100 to catch an end portion of the coil spring 2. For example, as shown in FIG. 13B and FIG. 13C, a proximal end portion of the spring fixing shaft 100 is formed into a D- or I-shaped cross-section having a flat catching portion 100a, and a hooking portion 2b formed at an end portion of the coil spring 2 is hooked on the flat catching portion 100a. Moreover, when the spring fixing shaft 100 is formed into a plate shape, the flat surface thereof forms the catching portion 100a.

Although the material of the spring fixing shaft 100 is not limited, when the spring fixing shaft 100 is formed from a synthetic resin, the spring fixing shaft 100 may expand due to a high-temperature use environment, moisture absorption and swelling caused by adhesion of a lubricant oil or the like, thereby increasing an overlapping margin with the coil spring 2 and further increasing a retention force.

What is claimed is:

1. A spring assembly comprising:
    a substrate;
    a coil spring having an end turn portion fixed to the substrate;
    an inner wall provided at an inner peripheral side of the coil spring so as to form a through hole in the substrate; and
    an outer wall provided at an outer peripheral side of the coil spring,
    wherein the inner wall forms a spring fixing wall configured to prevent the end turn portion of the coil spring from coming off in an axial direction of the coil spring,
    wherein the outer wall forms a support wall configured to prevent the end turn portion of the coil spring from moving in a radial direction of the coil spring,
    wherein the inner wall extends outward towards the outer wall so as to stake the end turn portion of the coil spring, and
    wherein a width of an opening formed by the inner wall and outer wall is less than a diameter of a wire rod forming the end turn portion of the coil spring.

2. The spring assembly of claim 1,
    wherein the inner wall extends from the substrate along the inner peripheral side of the coil spring, and
    wherein the outer wall extends from the substrate along the outer peripheral side of the coil spring.

3. The spring assembly of claim 2,
    wherein the outer wall forming the support wall is formed by half blanking to the substrate.

4. The spring assembly of claim 2,
    wherein the outer wall forming the support wall is formed by cutting and bending up the substrate.

5. The spring assembly of claim 2,
    wherein the inner wall forming the spring fixing wall is formed as a cylindrical wall extending from the substrate,
    wherein a distal opening edge of the cylindrical wall is broadened in diameter to stake the end turn portion of the coil spring to the cylindrical wall of the substrate,
    wherein an extension amount of the spring fixing wall from the substrate is set larger than a radius of a wire rod forming the coil spring,
    wherein an interval between a distal end of the spring fixing wall and a distal end of the support wall after being staked is smaller than a diameter of the wire rod, and
    wherein a gap is formed between the outer wall forming the support wall and the end turn portion of the coil spring.

6. The spring assembly of claim 2,
    wherein the inner wall forming the spring fixing wall is formed as a cylindrical wall extending from the substrate,
    wherein a distal opening edge of the cylindrical wall is broadened in diameter to stake the end turn portion of the coil spring to the cylindrical wall of the substrate, and
    wherein the outer wall forming the support wall is in contact with the end turn portion of the coil spring.

7. The spring assembly of claim 1, wherein the outer wall is formed in the substrate such that a side of the substrate opposite the coil spring extends toward the coil spring at a portion of the substrate on which the outer wall is formed.

8. The spring assembly of claim 1, wherein a side of the outer wall opposite the coil spring comprises a step portion.

9. The spring assembly of claim 1, wherein a bottom of the substrate includes an indented portion under the outer wall.

10. The spring assembly of claim 1, wherein a height of the outer wall is greater than a radius of a wire rod forming the coil spring.

11. The spring assembly of claim 1, wherein a gap is formed between the end turn portion of the coil spring and the outer wall.

12. A method for manufacturing a spring assembly the method comprising:
    providing a coil spring;
    providing a substrate, the substrate including:
        an inner wall provided at an inner peripheral side of the coil so as to form a through hole in the substrate; and
        an outer wall provided at an outer peripheral side of the coil spring;
    coaxially arranging the end turn portion of the coil spring to the inner wall of the substrate; and
    broadening the distal opening edge of the inner wall in diameter to form the the inner wall into a spring fixing wall while bringing the end turn portion of the coil spring into contact with the outer wall forming a support wall,
    wherein the spring fixing wall is configured so as to prevent the end turn portion of the coil spring from coming off in an axial direction of the coil spring,
    wherein the outer wall forming the support wall prevents the end turn portion of the coil spring from moving in a radial direction of the coil spring,
    wherein the inner wall extends outward towards the outer wall so as to stake the end turn portion of the coil spring, wherein the inner wall forming the spring fixing wall extends from substrate along the inner peripheral side of the coil spring, wherein the outer wall extends from the substrate along the outer peripheral side of the coil wring, wherein the inner wall forming the spring fixing wall is formed as a cylindrical wall extending from the substrate, wherein a distal opening edge of the cylindrical wall is broadened in diameter to stake the end turn portion of the coil spring to the cylindrical wall of the substrate, and wherein the outer wall forming the support wall is in contact with the end turn portion of the coil spring.

13. A spring assembly comprising:

a substrate comprising a metal;

a coil spring having an end turn portion fixed to the substrate;

an inner wall provided at an inner peripheral side of the coil spring; and an outer wall provided at an outer peripheral side of the coil spring, wherein the inner wall forms a spring fixing wall configured to prevent the end turn portion of the coil spring from coming off in an axial direction of the coil spring, wherein the outer wall forms a support wall configured to prevent the end turn portion of the coil spring from moving in a radial direction of the coil spring, wherein the inner wall extends outward towards the outer wall so as to stake the end turn portion of the coil spring, and wherein a width of an opening formed by the inner wall and outer wall is less than a diameter of a wire rod forming the end turn portion of the coil swing.

* * * * *